(No Model.)
M. NEIL.
HEDGE FENCE.
No. 591,874.  Patented Oct. 19, 1897.
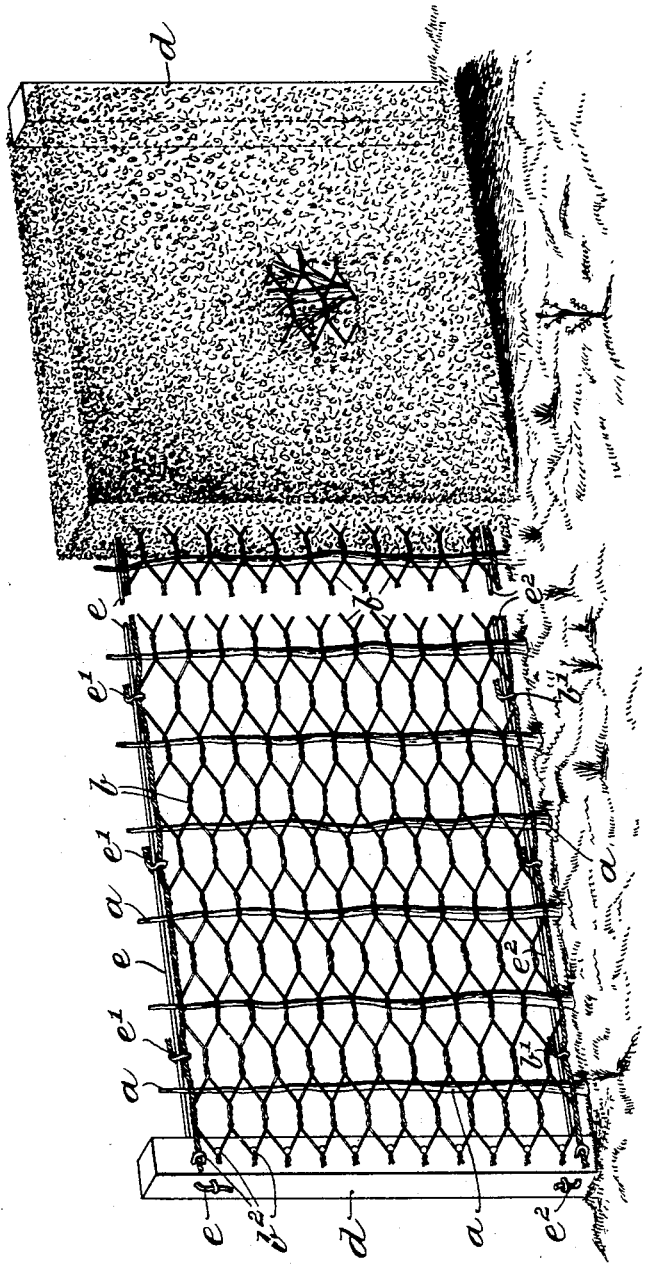
Witnesses:
Thomas M. Smith
Richard C. Maxwell
Inventor:
Michael Neil,
By J. Walter Douglass
Attorney.

UNITED STATES PATENT OFFICE.

MICHAEL NEIL, OF DAYTON, OHIO.

HEDGE FENCE.

SPECIFICATION forming part of Letters Patent No. 591,874, dated October 19, 1897.

Application filed August 3, 1897. Serial No. 646,861. (No model.)

*To all whom it may concern:*

Be it known that I, MICHAEL NEIL, a citizen of the United States, residing at Dayton, in the county of Montgomery and State of Ohio, have invented certain new and useful Improvements in Hedge Fences, of which the following is a specification.

My invention has relation to a hedge fence; and it particularly relates to the construction and arrangement of such a fence in which the canes or plants are arranged parallel to each other in vertical position and are reinforced by wire-netting secured to suitable posts, the netting being also secured at intervals along its top edge to a wire stretched between the posts and arranged on the side of the canes opposite to that along which the netting is stretched.

My invention, stated in general terms, consists of a hedge fence constructed and arranged in substantially the manner hereinafter described and claimed.

The nature and scope of my invention will be more fully understood from the following description, taken in connection with the accompanying drawing, representing in perspective view a hedge fence, one end of which is fully grown and the other end in process of construction.

Referring to said drawing, $a\ a\ a$ represent a series of plants or canes which are arranged vertically and parallel to each other. As shown at the left-hand end of the drawing, these plants or canes are cut off at the top and their side branches removed to permit of the fixing to the canes of a strip of wire-netting $b$. The lower edge of this netting $b$ may, if desired, be secured to certain of the canes or plants at or near their base and is arranged on one side only of the canes. The ends of the netting are secured, as at $b^2$, to the end posts or uprights $d$ of the fence. Between the posts $d$, and near the top of the canes $a$, is stretched a wire $e$, secured at either end to the posts and arranged on that side of the canes opposite that to which the netting is fixed. This wire $e$ is secured at intervals to the upper edge of the netting $b$ by ties $e'$, but neither the wire $e$ nor the netting $b$ is secured to the upper end of the canes. The wire $e$ serves as a support to maintain the netting in an upright position, and by reason of the connection of the netting at its upper edge to the line-wire the plants or canes $a$ are permitted to grow without being stunted or distorted.

Instead of securing the netting to the base of the canes, it is preferable to secure it by ties $b'$ to a second wire $e^2$, stretched along the base of the canes between the posts $d$ and arranged on the same side of the fence as the wire $e$. In this instance none of the canes are girdled by the tie-wires.

A hedge fence constructed as above described, in addition to permitting the canes to grow or shoot, serves by reason of the use of the netting to form an effectual and strong barrier, the netting serving to fill up openings or gaps resulting from a defective growth of the plants or canes, and such a fence may be treated and completed several years sooner than by the old methods of plashing.

Having thus described the nature and object of my invention, what I claim as new, and desire to secure by Letters Patent, is—

1. A hedge fence, consisting of a series of plants or canes arranged in vertical position and parallel to each other, a wire-netting placed on one side of the canes, posts or uprights to which the netting is secured, a wire stretched between the posts on the side of the canes opposite to that on which the netting is located, and ties securing the netting to the wire, said wire serving as the main support for the netting, substantially as and for the purposes described.

2. A hedge fence, consisting of a single row of plants or canes arranged in vertical position, a wire-netting placed on one side of the canes but disconnected therefrom, posts or uprights to which the netting is secured, two wires stretched between the posts on the side of the canes opposite to that on which the netting is located and ties securing the top and bottom edges respectively of the netting to said wires, substantially as and for the purposes described.

In testimony whereof I have hereunto set my signature in the presence of two subscribing witnesses.

MICHAEL NEIL.

Witnesses:
H. H. PRUGH,
VERNETTA SHADE.